May 18, 1965  P. ISAAC  3,184,187
RETRACTABLE AIRFOILS AND HYDROFOILS
Filed May 10, 1963  3 Sheets-Sheet 1
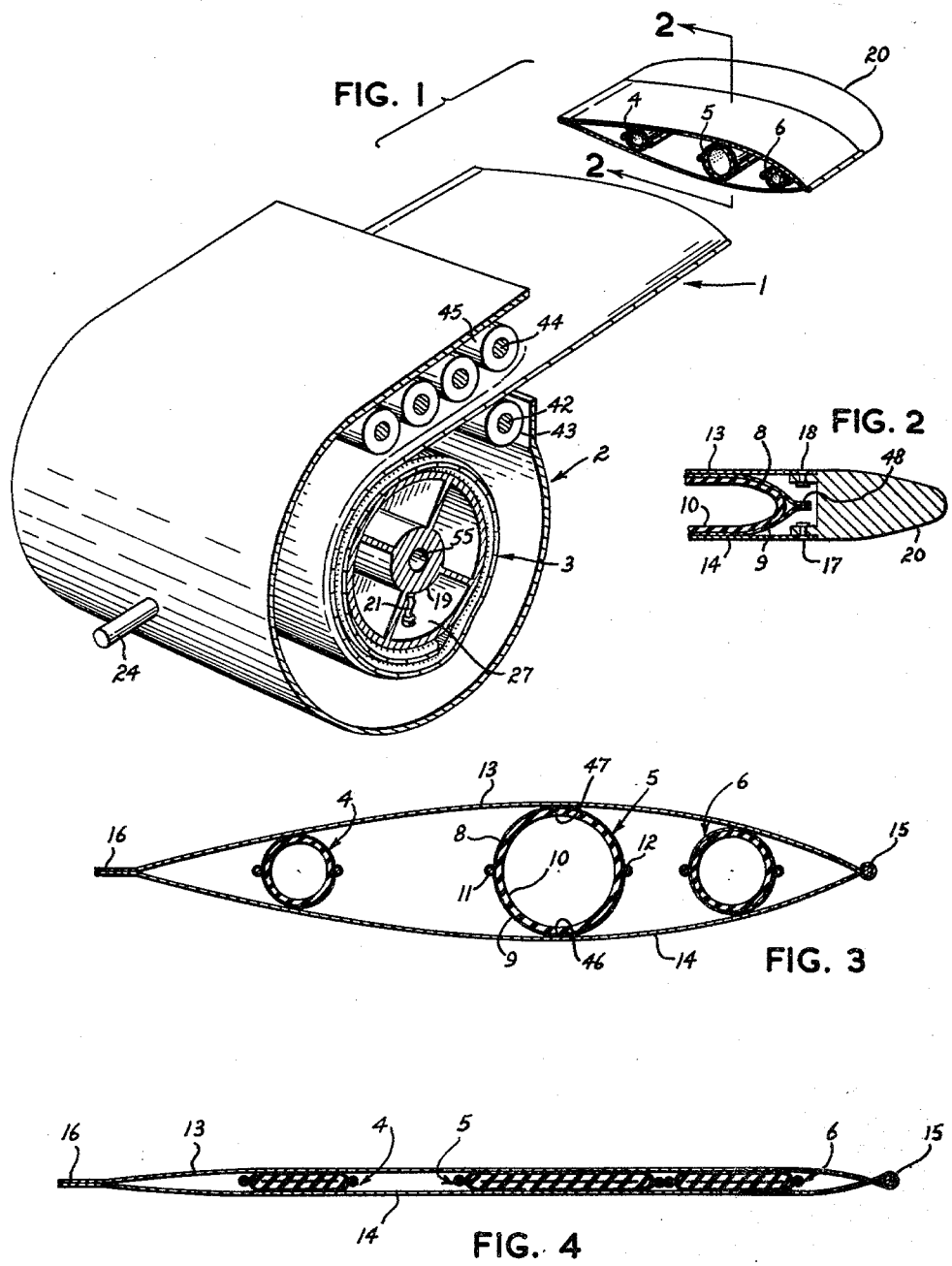

May 18, 1965   P. ISAAC   3,184,187
RETRACTABLE AIRFOILS AND HYDROFOILS
Filed May 10, 1963   3 Sheets-Sheet 2

Peter Isaac

May 18, 1965  P. ISAAC  3,184,187
RETRACTABLE AIRFOILS AND HYDROFOILS
Filed May 10, 1963  3 Sheets-Sheet 3
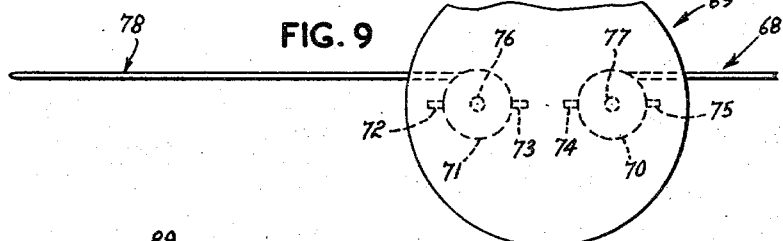
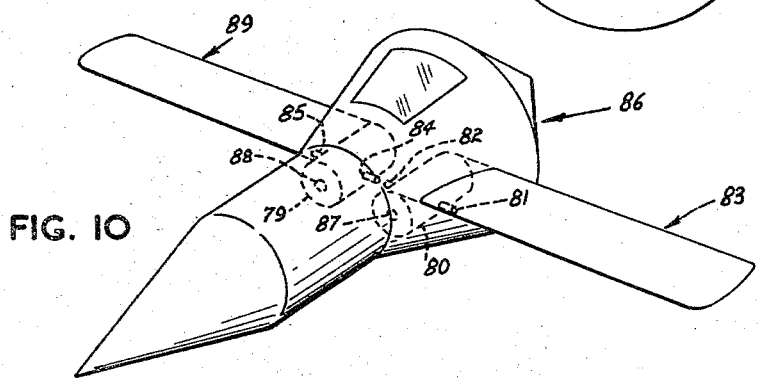
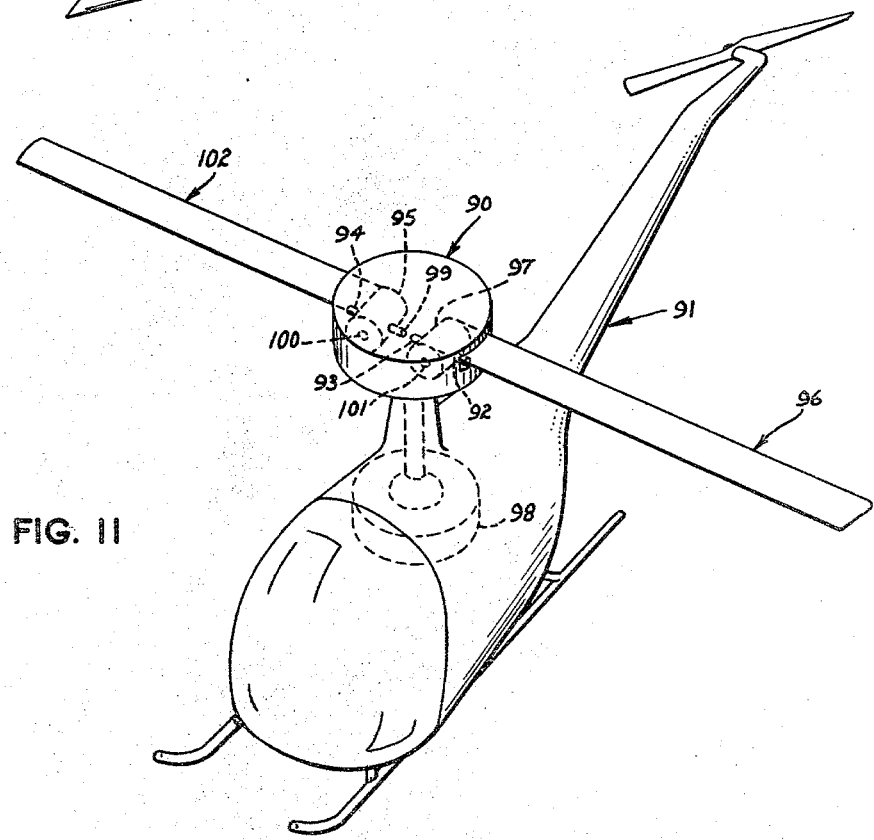

ial No. 279,520, filed May 10, 1963, now abandoned, which

United States Patent Office 3,184,187
Patented May 18, 1965

3,184,187
RETRACTABLE AIRFOILS AND HYDROFOILS
Peter Isaac, 9 Crown Hill Place, Apt. No. 410,
Toronto, Ontario, Canada
Filed May 10, 1963, Ser. No. 279,519
9 Claims. (Cl. 244—43)

It will be declared from the outset that the invention disclosed herein is a special application of a copending patent application entitled "Supple Rigid Members," Serial No. 279,520, filed May 10, 1963, now abandoned, which in turn is a refinement upon a copending patent application entiled "Inflatable Structural Members," bearing Serial Number 231,167, filed October 17, 1962, and from which this application forms a continuation-in-part.

My invention pertains to improvements in airfoils and hydrofoils and is particularly concerned with the retractable versions thereof which may be stored on a reel when not required and fed from the reel in the rigid state when required.

The airfoils and hydrofoils of today are of the permanent rigid types which are permanently fixed to the vehicle. These airfoils have several disadvantages; notably the lifting force of an airfoil depends on the velocity at which it is forced through the air. Consequently for take-off and landing of the aircraft, a long airfoil is desirable in order to reduce the take-off and landing speeds. However, for flights at high speed, short airfoils are preferable in order to reduce the drag of the aircraft and improve its manueverability. Hence airfoils of today are designed as a compromise between these two conflicting requirements. By means of the invention disclosed it is possible to provide airfoils whose span and geometry may be varied to suit the best requirements at any given flight condition.

It is the chief object of this invention to provide retractable airfoil and hydrofoil which may be stored on a reel when not required.

A further object is to provide an airfoil of variable span and means of adjusting the span to suit the optimun flight requirements at any particular speed of the aircraft.

A further object is to provide airfoil whose angle of incidence may be varied with respect to the aircraft in which they are mounted and thereby inherently providing the controlling function of the aircraft and minimizing the requirement for additional control surfaces.

A still further object of this invention is to provide the technical knowledge wherewith ground-air vehicles may be constructed which function as ground vehicles when the wings are retracted upon reels and as aircraft when the wings are extended.

A still further object is to provide retractable airfoils for spacecraft which are retracted except when the spacecraft glides to the ground.

A still further object is to provide a retractable rotor thereby making it possible to construct ground-air vehicles with vertical take-off capability.

With the foregoing objects in view and such others as may become apparent as this invention is understood, the present invention consists of the following construction and arrangement of parts as read with reference to the accompanying figures in which:

FIGURE 1 is a perspective view of a retractable airfoil extending from airfoil storage means in the rigid state showing details of construction of the airfoil and the storage means.

FIGURE 2 is a cross sectional view taken along the lines 2—2 of FIGURE 1 showing details of the airfoil tip and details of one of the inflatable spars wherewith the airfoil profile is produced.

FIGURE 3 is a cross sectional view through the extended rigid portion of the airfoil which projects from the reel, showing how the airfoil contour is produced by the use of the inflatable spars.

FIGURE 4 is a cross sectional view corresponding to FIGURE 3 showing the airfoil in the flexible state which it assumes while it is on the reel.

FIGURE 9 is a front elevational view of a ground-air vehicle showing how a pair of airfoils such as those illustrated in FIGURE 1 may be used as the wings which may be retracted upon the reels when the vehicle is to be operated on the ground.

FIGURE 10 illustrates how a pair of airfoils of the type illustrated in FIGURE 1 may be used in a spacecraft so it may be converted as a glider when it nears the ground.

FIGURE 11 illustrates how a pair of airfoils of the type illustrated in FIGURE 1 may be used to construct a rotor of a helicopter.

Figure 6:
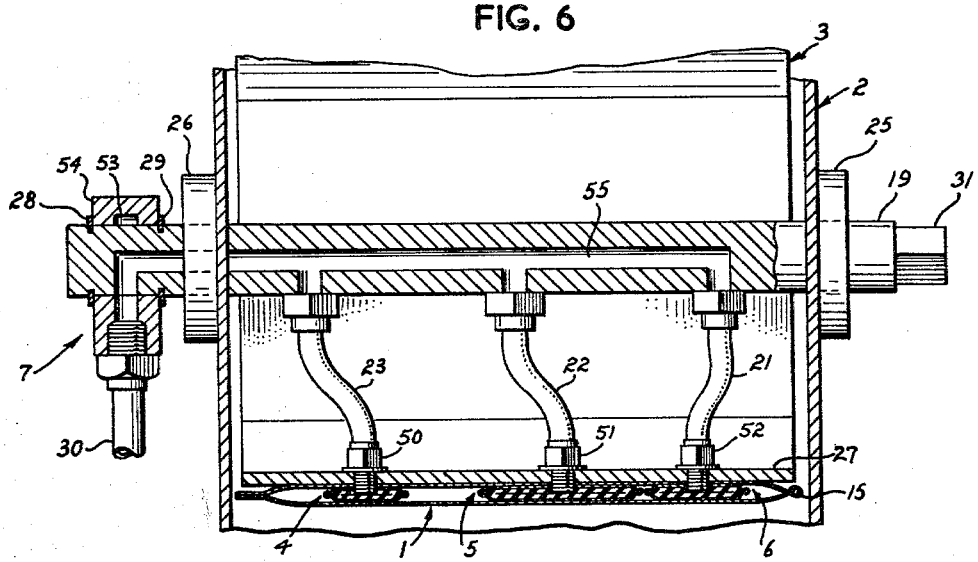
FIGURE 6 is a cross sectional view taken through the centre of the shaft of the reel of FIGURE 1 illustrating the manner in which fluid is fed to the inflatable spars via a fluid coupling from an external source.

The basic concept of this invention may be understood with reference to FIGURES 1 and 6. FIGURE 1 illustrates an airfoil 1 protruding from airfoil storage means 2, in which it is stored when it is not required, a reel 3 on which the airfoil is reeled, a housing which supports the reel on bearing means 25 and 26 and a fluid coupling 7, seen in FIGURE 6, whereby a fluid may be fed into the inflatable spars 4, 5 and 6 wherewith the airfoil 1 is given its proper contour.

Describing first the airfoil 1, it basically comprises two resilient sheets 13 and 14 of material such as metal which are preferably hinged at the leading edge of the airfoil by the wire hinge 15 and seam welded at the trailing edge 16. The sheets are attached to the airfoil tip 20 by means such as the rivets 17 and 18 illustrated in FIGURE 2. The other terminal ends of the sheets, which are on the reel as seen in FIGURE 6, may be bonded, seam welded or riveted together. Mounted within the airfoil 1 are three inflatable spars 4, 5 and 6 which are essentially parallel to the airfoil. By means of these spars the airfoil attains its characteristic shape as will be described as this specification proceeds.

Although three inflatable spars are shown it will be appreciated that any convenient number may be used depending only on the space which is available. Describing the inflatable spar 5 in detail it comprises two strips 8 and 9 of resilient material which are hinged together at the longitudinal edges by the wire hinges 11 and 12. Contained within the strips are sealing means which as shown comprise a tube 10 of supple material such as rubber which provides a leakproof container for the fluid when the inflatable spar is inflated. The strips 8 and 9 are closed off at the terminal ends by seam welding the end 48 as seen in FIGURE 2. The strip 8 is attached to the resilient sheet 13 by suitable means such as rivets or spot welds 47 and the strip 9 is likewise attached to sheet 14 by suitable means such as spot welds 46.

The inflatable spars 4, 5 and 6 and the airfoil 1 are attached to the drum 27 of the reel 3 by means of the fittings 50, 51 and 52 as shown in FIGURE 6. The fittings have internal passageways which communicate with the passageway 55 in the shaft 19 of the reel via the fluid lines 23, 22 and 21 respectively.

The fluid coupling 7 seen in FIGURE 6 comprises an annular body 54 with an annular groove 53 which is in constant communication with the fluid line 30. The coupling is retained on the shaft 19 of the reel by means of the spring retainers 28 and 29. The coupling shown is for illustrative purposes only since many of the commercially available couplings may be used for this purpose.

The reel may be operated by attaching reel operating means to the square end 31 of the shaft. The reel operating means are not illustrated since they may comprise any commercial motor by itself, or in conjunction with a speed reducer, along with motor positioning controls, or a simple actuator may be used.

The operation of the airfoil will now be described. The airfoil 1 is normally fully retracted upon the reel 3, it being guided by the rollers 43 and 45 while it is being retracted. The rollers 43 and 45 which journal on the pins 42 and 44 respectively provide the means whereby the load of the airfoil is transmitted to the reel housing.

As seen in FIGURE 1, the portion of the airfoil between the rollers is fully inflated and rigid. When it is necessary to extend the airfoil 1, the shaft 19 is rotated by the motor means attached to the square end of the shaft 31 while simultaneously a fluid under pressure is fed into the fluid line 30. The fluid enters the inflatable spars 4, 5 and 6 by means previously described and inflates the portions of these spars which protrude from the reel to the contour shown in FIGURES 1 and 3. The inflation disposes the sheets 13 and 14 of the airfoil to the profile shown in FIGURE 3 which is the elementary profile of an airfoil. The portion of the airfoil on the reel does not inflate to any noticeable extent because inflation would subject the sheets 13 and 14 to a double curvature, which requires much higher fluid pressures than are used in the operation of the airfoil. Consequently by rotating the shaft 19 of the reel 3, the span of the airfoil may be varied with the protruding portion thereof remaining in the rigid state.

The problem of reeling the airfoil may be simplified by precurling the resilient sheets 13 and 14 in the form of a spiral spring. Likewise the strips 8 and 9 of the inflatable spar 5 may be precurled in the form of a spiral spring. It will be evident that if the preceding techniques are utilized the normal tendency of the airfoil 1 will be to remain upon the reel 3 and the airfoil 1 may only be extended by feeding fluid into the inflatable spars and by rotating the shaft 19.

Although the inflatable spars will normally be inflated to essentially circular cross sections, as shown in FIGURE 3, it will be apparent that the shape of these inflatable spars and hence of the airfoil will depend on the magnitude of the fluid pressure. Hence in some applications it may be desirable to regulate the fluid pressure and thereby vary the profile of the airfoil. For high speed flight a thinner wing section is preferred than for low speed flight.

Prior to discussing the application of the airfoil two other embodiments of construction will be described.

Figure 5:
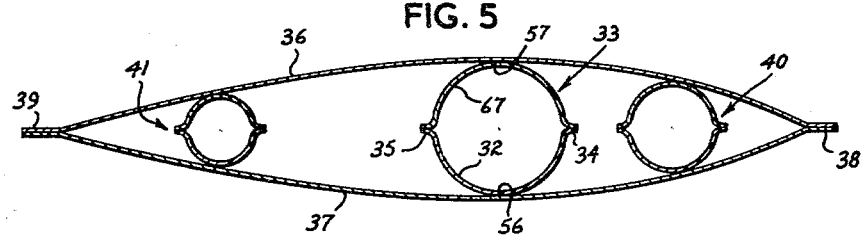
FIGURE 5 is a cross sectional view which corresponds to FIGURE 3 but which illustrates an alternative embodiment of construction.

FIGURE 5 illustrates an airfoil corresponding to FIGURE 3, in which only metallic components are used. The airfoil comprises two sheets 36 and 37 of resilient material which are seam welded at the edges 38 and 39. The inflatable spars 33, 40 and 41 correspond to the inflatable spars 4, 5 and 6 of FIGURE 3 differing essentially in that the supple tubes 10 have been eliminated. The inflatable spar 33 comprises two strips 32 and 67 of resilient material which are seam welded at the common edges 34 and 35. The inflatable spar 33 is held in position with respect to the airfoil by seam welding strip 67 to sheet 36 along the line 57 and seam welding strip 32 to sheet 37 by seam welding along the line 56. It will of course be realized that other fastening means such as riveting may be used instead.

The chief advantage of the airfoil embodiment of FIGURE 5 is that the use of organic materials is thereby eliminated making it suitable for high temperature applications.

Figure 7:
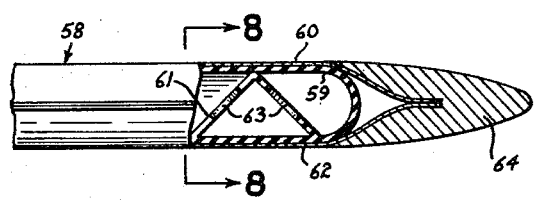
FIGURE 7 illustrates a third embodiment of the invention showing how a specific external contour may be achieved by using a webbed bladder.
Figure 8:
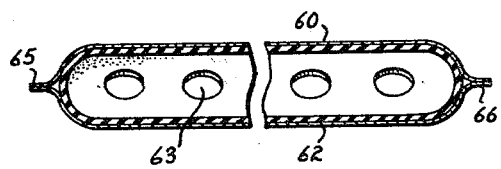
FIGURE 8 is a cross sectional view taken along the lines 8—8 of FIGURE 7 illustrating details of construction of this embodiment.

A further embodiment is shown in FIGURES 7 and 8. These figures do not show an airfoil section although the principle employed may readily be used in constructing airfoils.

The member 58 corresponds to the airfoil 1 of FIGURE 1. A specific contour of FIGURE 8 is produced by using a bladder 59 which is bonded to the internal sheets 60 and 62 of the member. The sheets 60 and 62 are seam welded at the edges 65 and 66. The webbing 61, which is integral with the bladder, restrains its expansion when it is inflated, thereby giving rise to the inflated profile shown in FIGURE 8. It will be appreciated that by appropriate design of the bladder 59 and webbing 61 the characteristic profile shown in FIGURE 5 may be produced. The holes 63 in the webbing 61 provide for free flow of the fluid within the bladder.

The application of the invention as described beforehand will now be discussed.

FIGURE 9 shows a front elevational view of a ground-air vehicle 69 employing the retractable airfoils 68 and 78 extending from the reel housings 70 and 71 respectively. The housings 70 and 71 may either be rigidly mounted in the fuselage of the ground-air vehicle or may be rotatably mounted; that is the reel housing 71 may rotate on the trunnions 72 and 73, the latter 73 corresponding to the trunnion 24 shown in FIGURE 1 and the reel housing 70 may be rotatably mounted on the trunnions 74 and 75. It is of course understood that if the housings are rotatably mounted, motors or actuators will be attached to the trunnions 73 and 74.

The operation of the airfoils is as follows: When the ground-air vehicle is to be operated on the ground, reel operating means attached to the reel shafts 76 and 77 would be operated such that the airfoils 68 and 78 would be completely retracted within the fuselage 69 of the vehicle. When the ground-air vehicle is to function as an aircraft, the motor means referred to are operated in such a direction as to project the airfoils from the reels, it being understood that the airfoils would be inflated as discussed previously in this specification. The airfoil span of the aircraft would be controlled by the pilot to suit the optimum flight requirements. That is for take-off a long airfoil span would be used and for flight at high speed a shorter span would be employed. In addition the pilot would be able to apply a differential span. That is, by extending one airfoil, say 78, somewhat further than the other airfoil 68, the aircraft would bank thereby eliminating the requirement for conventional ailerons. The same result can be achieved by changing the angle of incidence of one airfoil relative to the other by rotating the reel housing 71 about its trunnions 72 and 73, or by rotating the reel housing 70 about its trunnions 74 and 75.

The application of the retractable airfoil to a spacecraft will be apparent from the study of FIGURE 10. The spacecraft 86 may be equipped with two retractable airfoils 83 and 89 which are stored in the reel housings 80 and 79 respectively. Reel operating means may be attached to the shafts 87 and 88 of the reels which are not shown. The airfoils would under normal conditions be fully retracted within the spacecraft 86, and only extended when the spacecraft is ready for a landing. Again, as discussed with reference to the ground-air vehicle of FIGURE 9, the trunnions 84 and 85 of the reel housing 79 and the trunnions 81 and 82 of the reel housing 80 may be permanently fixed to the spacecraft or pivotally mounted, permitting each airfoil to function independently.

A still further application of the retractable airfoil will be apparent with reference to FIGURE 11 which shows a helicopter 91 basically comprising the rotor 90, the retractable airfoils 96 and 102, with the rotor being rotated by the motor 98. The rotor 90 essentially comprises left airfoil storage means 97 and right airfoil storage means 95. The right airfoil storage means 95 includes a reel on which the airfoil 102 may be reeled and reel operating means, not shown, which are connected to the shaft 100 of the reel. Attached to the storage means are trunnions 94 and 99 to which means may be connected for varying the angle of attack of the airfoil as the rotor rotates, as is required of helicopter rotors. The left airfoil storage means 97 include a reel on which the left airfoil 96 may be reeled and reel operating means, not shown, which are connected to the shaft 101 of the reel. Attached to the storage means 97 are trunnions 92 and 93 which are also attached to the means referred to for varying the angle of attack of the airfoil 96 as the rotor rotates.

It is not the intent of this specification to deal in detail with the control elements required which are necessary to make the airfoils function satsfactorily in the manner described, but rather to indicate the wide potential application of this invention.

That is, FIGURE 9 basically indicates how a ground-air vehicle may be constructed which will function satisfactorily either as a ground vehicle or as an aircraft. FIGURE 11 indicates how the vehicle of FIGURE 9 may be provided with vertical take-off capability, thereby making it possibles to build a vehicle which will operate on the roads of a congested city, or take off vertically and be flown as a conventional aircraft after it is airborne.

Although the preceding discussion has been restricted to airfoils it will be apparent that the disclosure is applicable to hydrofoils. Hence the term "Fluid foil" has been coined that embraces airfoils and hydrofoils, it being understood that the term refers to either an airfoil or to a hydrofoil.

What I claim as my invention is:

1. An inflatable fluidfoil combined with fluidfoil storage means from which said inflatable fluidfoil may be extended and retracted in a structurally rigid state, said inflatable fluidfoil at least including two resilient sheets which are predominantly flat and parallel to each other when said inflatable fluidfoil is in said fluidfoil storage means and dished outwardly from each other when said inflatable fluidfoil is inflated, edge joining means for joining opposite edges of said resilient sheets, collapsible spar means situated between said resilient sheets and oriented parallel to the longitudinal axis of said inflatable fluidfoil, said fluidfoil storage means at least including a reel on which said inflatable fluidfoil may be reeled and to which it is attached, housing means for supporting said reel, fluidfoil inflating and deflating means, and reel rotating means whereby said inflatable fluidfoil may be extended and retracted from said fluidfoil storage means.

2. The inflatable fluidfoil of claim 1 in which said edge joining means at least include a rigid fluidfoil tip which is attached to the end of said inflatable fluidfoil which extends from said fluidfoil storage means and hinge means joining said resilient sheets at the leading edge of said fluidfoil.

3. The inflatable fluidfoil of claim 1 in which said edge joining means at least include a rigid fluidfoil tip which is attached to the end of said inflatable fluidfoil which extends from said fluidfoil storage means, hinge means joining said resilient sheets at the leading edge of said inflatable fluidfoil and bonding joining said resilient sheets at the trailing edge of said inflatable fluidfoil.

4. The inflatable fluidfoil of claim 1 in which said collapsible spar means at least include one inflatable spar which is located between said resilient sheets and attached thereto and which is flexible when deflated and structurally rigid when inflated, said inflatable spar at least comprising two resilient strips which are predominantly flat and parallel to each other when said inflatable fluidfoil is in said fluidfoil storage means, sealing means for retaining fluid within said inflatable spar when it is inflated, said fluidfoil inflating and deflating means providing the inflating and deflating means for said inflatable spar.

5. The inflatable fluidfoil of claim 4 in which said resilient strips are joined at the longitudinal edges by hinges.

6. The inflatable fluidfoil of claim 4 in which said resilient strips are joined at the longitudinal edges by bonding.

7. A ground-air vehicle for operation on the ground and in the air at least comprising a fuselage and one pair of inflatable fluidfoils combined with fluidfoil storage means according to claim 1, said storage means being mounted in said fuselage in a back-to-back relationship such that said fluidfoils are extendible laterally outwards from said fuselage substantially at right angles to the direction of motion for providing lift for said ground-air vehicle in the air and retractable into said fuselage for operation of said ground-air vehicle on the ground.

8. The ground-air vehicle of claim 7 in which said storage means are pivotally mounted in said fuselage such that the angle of incidence of said fluidfoils may be varied relative to said fuselage.

9. An inflatable fluidfoil combined with fluidfoil storage means from which said inflatable fluidfoil may be extended and retracted in a structurally rigid state, said inflatable fluidfoil at least including two resilient sheets which are predominantly flat and parallel to each other when said inflatable fluidfoil is in said fluidfoil storage means and dished outwardly from each other when said inflatable fluidfoil is inflated, edge joining means for joining opposite edges of said resilient sheets, fluidfoil contour controlling means comprising a bladder of supple material which is situated between said resilient sheets and attached thereto, said bladder having webbing of supple material, said fluidfoil storage means at least including a reel on which said inflatable fluidfoil may be reeled and to which it is attached, housing means for supporting said reel, fluidfoil inflating and deflating means, and reel rotating means whereby said inflatable fluidfoil may be extended and retracted from said fluidfoil storage means.

References Cited by the Examiner

UNITED STATES PATENTS

| | | | |
|---|---|---|---|
| 2,226,978 | 12/40 | Pescara | 170—160.11 X |
| 2,979,287 | 4/61 | Ross | 244—44 |
| 2,991,747 | 7/61 | Bader et al. | 114—66.5 |
| 2,996,121 | 8/61 | Stub | 170—160.5 X |
| 3,074,232 | 1/63 | Soyer | 244—44 |
| 3,101,121 | 8/63 | MacNeal | 170—160.5 X |

OTHER REFERENCES

"Aviation Week," published Sept. 1, 1958, page 59 relied on.

FERGUS S. MIDDLETON, *Primary Examiner*.